US008199673B2

(12) United States Patent
Narayanan et al.

(10) Patent No.: US 8,199,673 B2
(45) Date of Patent: Jun. 12, 2012

(54) METHODS AND APPARATUS FOR DISCOVERY OF PEER TO PEER OVERLAYING NETWORKS

(75) Inventors: Vidya Narayanan, San Diego, CA (US); Ranjith S. Jayaram, San Diego, CA (US); Lakshminath R. Dondeti, San Diego, CA (US); Edward T. L. Hardie, Menlo Park, CA (US)

(73) Assignee: QUALCOMM Incorporated, San Diego, CA (US)

( * ) Notice: Subject to any disclaimer, the term of this patent is extended or adjusted under 35 U.S.C. 154(b) by 340 days.

(21) Appl. No.: 12/485,553

(22) Filed: Jun. 16, 2009

(65) Prior Publication Data

US 2009/0310517 A1     Dec. 17, 2009

Related U.S. Application Data

(60) Provisional application No. 61/073,325, filed on Jun. 17, 2008.

(51) Int. Cl.
*H04L 12/28* (2006.01)
(52) U.S. Cl. ........................................ 370/254; 709/217
(58) Field of Classification Search .................. 370/254; 701/200
See application file for complete search history.

(56) References Cited

U.S. PATENT DOCUMENTS

| | | | |
|---|---|---|---|
| 6,906,643 B2 * | 6/2005 | Samadani et al. | 340/995.18 |
| 7,907,934 B2 * | 3/2011 | Naghian | 455/410 |
| 7,953,888 B2 * | 5/2011 | Ricciulli | 709/239 |
| 2006/0039371 A1 | 2/2006 | Castro et al. | |
| 2007/0078828 A1 * | 4/2007 | Parikh et al. | 707/3 |
| 2007/0250590 A1 * | 10/2007 | Flannery et al. | 709/217 |
| 2008/0056264 A1 | 3/2008 | Ong | |
| 2008/0089244 A1 | 4/2008 | Yu | |

FOREIGN PATENT DOCUMENTS

WO   WO 03019870 A2   3/2003

OTHER PUBLICATIONS

Bryan, et al: "Concepts and Terminology for Peer to Peer SIP"; Cisco Systems; P2PSIP Working Group; Internet-Draft; Mar. 4, 2007.

(Continued)

*Primary Examiner* — Robert Wilson
*Assistant Examiner* — Wei Zhao
(74) *Attorney, Agent, or Firm* — Kristine U. Ekweume

(57) ABSTRACT

Methods and apparatus for discovery of peer-to-peer overlay networks. In an aspect, a method includes receiving a request to discover information about overlay networks of interest, generating a search query that comprises at least one parameter associated with the overlay networks of interest, and transmitting the search query to nodes on a local area network. In another aspect, an apparatus includes a memory comprising an overlay database of meta-data associated with one or more known overlay networks and a processor coupled to the memory and configured to obtain a search query that comprises at least one parameter associated with overlay networks of interest, determine one or more selected overlay networks from the overlay database based on the at least one parameter, and transmit meta-data associated with the one or more selected overlay networks in response to the search query.

56 Claims, 6 Drawing Sheets

OTHER PUBLICATIONS

Gupta, et al: "Efficient Routing for Peer-to-Peer Overlays"; MIT Computer Science and Artificial Intelligence Laboratory; csail.mit.edu, 2009.

Guha, et al: "NAT Behavioral Requirements for TCP draft-ietf-behave-tcp-7.txt"; Cisco Systems; Network Working Group; Internet-Draft; Oct. 30, 2007.

Cheshire, et al: "DNS-Based Service Discovery"; Apple Inc.; Internet-Draft; Sep. 10, 2008.

Cheshire, et al: "Multicast DNS"; Apple Inc.; Internet-Draft, Sep. 10, 2008.

Rosenberg, J.: "Interactive Connectivity Establishment (ICE): A Protocol for Network Address Translator (NAT) Traversal for Offer/Answer Protocols"; Cisco Systems; Internet-Draft; Oct. 29, 2007.

Rosenberg, J.; "TCP Candidates with Interactive Connectivity Establishment (ICE)"; Cisco Systems; Internet-Draft; Feb. 25, 2008.

Rosenberg, J.: "NICE: Non Session Initiation Protocol (SIP) Usage of Interactive Connectivity Establishment (ICE)"; Cisco Systems; Internet-Draft; Feb. 15, 2008.

Rosenberg, et al: "Session Traversal Utilities for (NAT) (STUN)"; Cisco Systems; Internet-Draft; Feb. 23, 2008.

Rosenberg, et al: "Traversal Using Relays Around NAT (TURN): Relay Extensions to Session Traversal Utilities for NAT (STUN)"; Cisco Systems; Internet-Draft; Feb. 25, 2008.

International Search Report and Written Opinion—PCT/US2009/047706, International Search Authority—European Patent Office—Dec. 18, 2009.

* cited by examiner

METHODS AND APPARATUS FOR DISCOVERY OF PEER TO PEER OVERLAYING NETWORKS

CLAIM OF PRIORITY UNDER 35 U.S.C. §119

The present Application for Patent claims priority to Provisional Application No. 61/073,325 entitled "Methods and Apparatus for Discovering Overlay Networks" filed Jun. 17, 2008, and assigned to the assignee hereof and hereby expressly incorporated by reference herein.

BACKGROUND

1. Field

The present application relates generally to the operation of overlay networks, and more particularly, to methods and apparatus for discovery of peer-to-peer overlay networks.

2. Background

A network in which member nodes obtain services in the absence of server-based infrastructure is referred to herein as a "peer-to-peer" overlay network. In a peer-to-peer overlay, peer nodes co-operate with each other both to provide services and to maintain the network. Peer-to-peer overlay networks can be built on top of an underlying network, such as a network utilizing the Internet Protocol (IP).

For a node to participate in a peer-to-peer overlay network, it must discover the names of existing overlay networks and meta-data associated with these overlay networks. The meta-data typically includes the IP addresses of "introducer" nodes that can help the joining node join a particular overlay network.

There are several traditional approaches to solving the overlay network discovery problem. A node may find the names of available overlay networks using an out-of-band mechanism like a web search. Next, the node may use a domain name services (DNS) to resolve any discovered overlay network names to find the Internet Protocol (IP) addresses of introducer nodes. In a second approach, a well-known super overlay network is used. Any node that wishes to discover other overlay networks joins the super overlay network and queries nodes in the super overlay network for information about other overlay networks. Unfortunately, these techniques are inefficient and make it difficult for a node to discover and join a particular overlay network Therefore, it is desirable to have a simple cost effective mechanism that operates to allow a node to discover peer-to-peer overlay networks.

SUMMARY

In one or more aspects, a peer-to-peer overlay network discovery system, comprising methods and apparatus, is provided that operates to allow a node to discover peer-to-peer overlay networks. In various aspects, the system operates to allow a node to use local area transport mechanisms, such as IP multicast, to discover information associated with overlay networks gathered by other nodes in the local area. This information can then be used by the node to join a particular overlay network.

In an aspect, a method is provided for operating a node to discover overlay networks. The method comprises receiving a request to discover information about overlay networks of interest, generating a search query that comprises at least one parameter associated with the overlay networks of interest, and transmitting the search query to nodes on a local area network.

In an aspect, an apparatus is provided that is configured to discover overlay networks. The apparatus comprises means for receiving a request to discover information about overlay networks of interest, means for generating a search query that comprises at least one parameter associated with the overlay networks of interest, and means for transmitting the search query to nodes on a local area network.

In an aspect, an apparatus is provided that is configured to discover overlay networks. The apparatus comprises a processor configured to receive a request to discover information about overlay networks of interest and generate a search query that comprises at least one parameter associated with the overlay networks of interest and a transceiver configured to transmit the search query to nodes on a local area network.

In an aspect, a computer program product is provided for discovering overlay networks. The computer program product comprises a computer-readable medium embodying codes executable to receive a request to discover information about overlay networks of interest, generate a search query that comprises at least one parameter associated with the overlay networks of interest, and transmit the search query to nodes on a local area network.

In an aspect, a method is provided for operating a node to discover overlay networks. The method comprises maintaining an overlay database of meta-data associated with one or more known overlay networks, obtaining a search query that comprises at least one parameter associated with overlay networks of interest, determining one or more selected overlay networks from the overlay database based on the at least one parameter, and transmitting meta-data associated with the one or more selected overlay networks in response to the search query.

In an aspect, an apparatus is provided that is configured to discover overlay networks. The apparatus comprises means for maintaining an overlay database of meta-data associated with one or more known overlay networks, means for obtaining a search query that comprises at least one parameter associated with overlay networks of interest, means for determining one or more selected overlay networks from the overlay database based on the at least one parameter, and means for transmitting meta-data associated with the one or more selected overlay networks in response to the search query.

In an aspect, an apparatus is provided that is configured to discover overlay networks. The apparatus comprises a memory comprising an overlay database of meta-data associated with one or more known overlay networks and a processor coupled to the memory and configured to obtain a search query that comprises at least one parameter associated with overlay networks of interest, determine one or more selected overlay networks from the overlay database based on the at least one parameter, and transmit meta-data associated with the one or more selected overlay networks in response to the search query.

In an aspect, a computer program product is provided that is configured to discover overlay networks. The computer program product comprises a computer-readable medium embodying codes executable to maintain an overlay database of meta-data associated with one or more known overlay networks, obtain a search query that comprises at least one parameter associated with overlay networks of interest, determine one or more selected overlay networks from the overlay database based on the at least one parameter, and transmit meta-data associated with the one or more selected overlay networks in response to the search query.

Other aspects will become apparent after review of the hereinafter set forth Brief Description of the Drawings, Description, and the Claims.

BRIEF DESCRIPTION OF THE DRAWINGS

The foregoing aspects described herein will become more readily apparent by reference to the following Description when taken in conjunction with the accompanying drawings wherein.

DESCRIPTION

The following description describes aspects of a peer-to-peer overlay network discovery system that operates to allow a node to discover peer-to-peer overlay networks. The system operates such that a node that wishes to discover existing peer-to-peer overlay networks sends an "overlay search" query on its local area network. The query comprises one or more attributes (or parameters) that identify the types of overlay networks of interest to the node. In one implementation, the overlay search query may be transmitted to a well-known IP multicast or broadcast address. The nodes on the local area network operate to keep track of the overlay networks they become aware of and the meta-data associated with these overlay networks. When they receive the overlay search query, they respond with information about the overlay networks known to them that match the search criteria. Thus, the requesting node is able to efficiently discover overlay networks of interest from other nodes in its local area.

Figure 1:
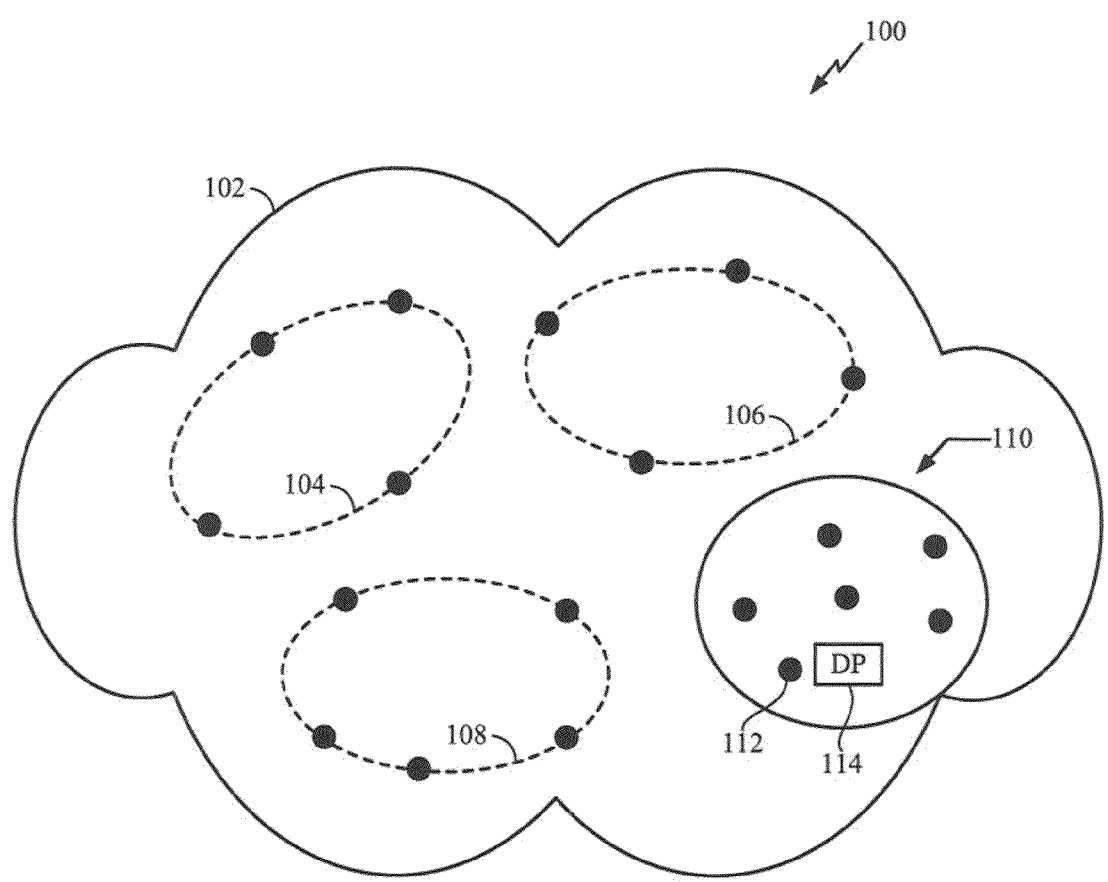
FIG. 1 shows a network that illustrates aspects of a peer-to-peer overlay network discovery system.

FIG. 1 shows a network 100 that illustrates aspects of a peer-to-peer overlay network discovery system. The network 100 comprises an underlying network 102 which comprises any type of network, such as an Internet Protocol network. Although the underlying network 102 is shown as a single entity, the underlying network may comprise any number or types of networks such as WANs, LANs, wireless networks or any other type of network.

The underlying network comprises multiple peer-to-peer overlay networks (104, 106, and 108). The peer-to-peer overlay networks 104, 106 and 108 each comprise a subset of nodes of the underlying network 102 and operate utilizing the services of the underlying network 102 to allow those nodes to communicate. For example, in the peer-to-peer overlay networks 104, 106, and 108, the nodes are connected by communication links provided by the underlying network 102 to form desired routing paths. It should also be noted that the peer-to-peer overlay networks 104, 106, and 108 may have any topology or architecture to enable any routing configuration and are not limited to the configurations shown in FIG. 1.

The underlying network 102 also comprises a local area network, shown generally at 110, that comprises a plurality of nodes. The nodes of the local area network 110 are operable to communicate with other nodes on the network 102 and with each other utilizing unicast, multicast, or broadcast transmissions. For example, the node 112 that is part of the local area network 110 may multicast or broadcast messages to other nodes in the local area network 110.

In accordance with the overlay discovery system, the nodes of the local area network 110 comprise a discovery processor (DP) 114. For the purpose of this description, the DP 114 is shown at node 112; however, it will also be assumed that the DP 114 is available at other nodes of the local area network 110. The DP 114 operates to save information and meta-data about overlay networks that its associated node becomes aware of during operation on the network 102. For example, the information comprises, but is not limited to; overlay names, IP addresses of nodes, IP addresses of introducer nodes, and/or other meta-data associated with overlay networks known on the network 102. This information is acquired during operation of the nodes of the local area network 110 while performing message routing or other tasks. The information is saved at the DP 114 for later use.

In an aspect, the discovery processors located at the nodes of the local area network 110 automatically advertise their respective information about known overlay networks. Thus, the DP 114 operating at node 112 is able to listen to these advertisements to become aware of one or more overlay networks.

In another aspect, in response to a request, for instance by an application executing at the node 112, the DP 114 generates and sends an overlay search query on the local area network 110 to obtain information associated with overlay networks that match the parameters in the search query. The query comprises one or more attributes or parameters that identify the types of overlays of interest to the node 112. For example, the search query comprises one or more of the following parameters, but is not limited to only these parameters.

1. Overlay names
2. Content types
3. Specific content
4. Quality of service (QoS) parameters
5. Overlay operating region
6. Overlay network type parameter In an aspect, the overlay search query may be transmitted to a well-known IP multicast or broadcast address or it may be transmitted to a well-defined Overlay Discovery service instance. In the latter case, the service instances are first discovered using any known service discovery protocols. In either case, the DPs 114 operating at nodes on the local area network 110 keep track of the overlay networks they become aware of and the meta-data associated with these overlay networks. When they receive an overlay search query, they respond with information about the overlay networks known to them that match the search criteria. A more detailed description of the operation of the DP 114 is provided below. Thus, the peer-to-peer overlay network discovery system operates to allow a node to discover peer-to-peer overlay networks of interest.

Figure 2:
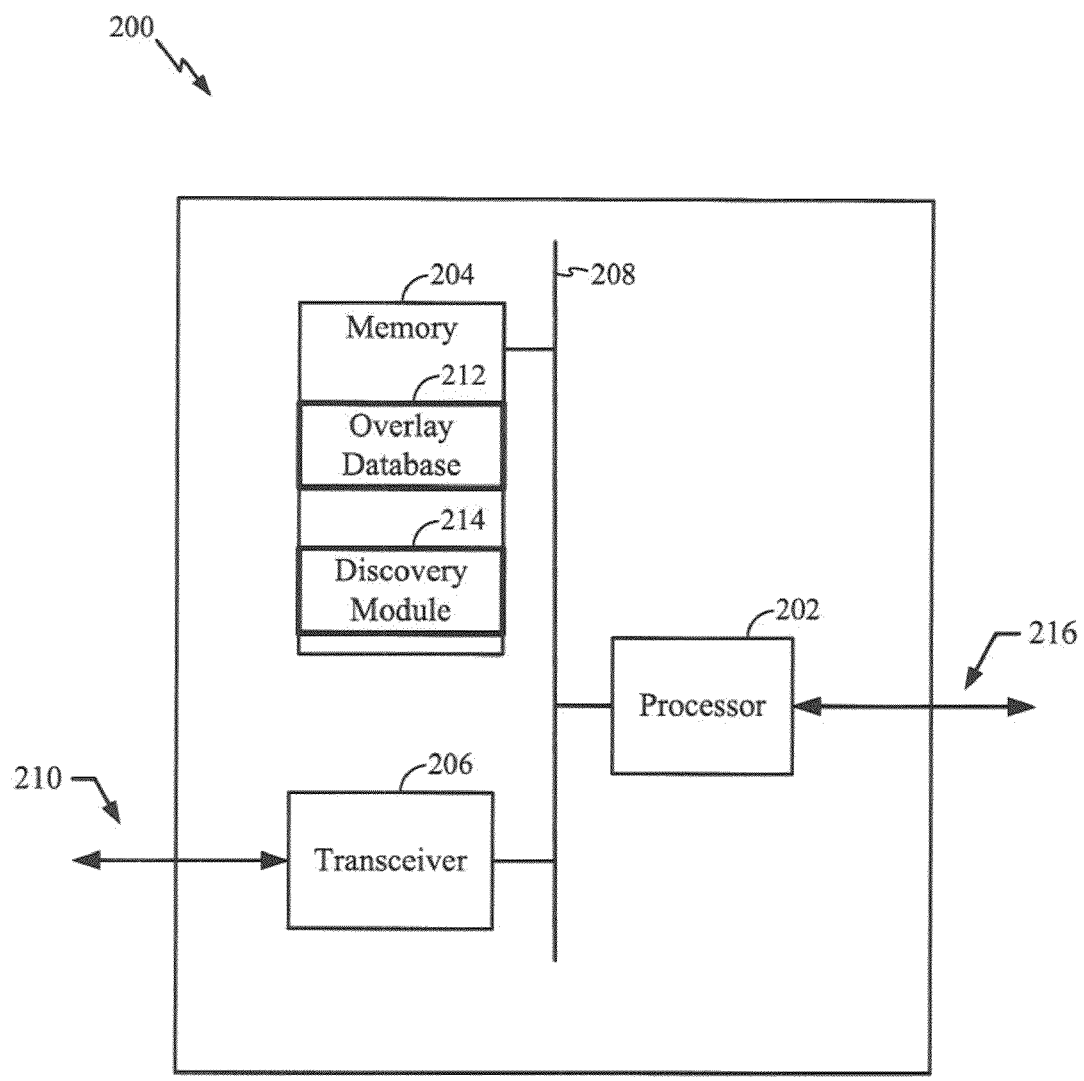
FIG. 2 shows an exemplary discovery processor for use at a node in aspects of a peer-to-peer overlay discovery system.

FIG. 2 shows an exemplary discovery processor 200 for use at a node in aspects of a peer-to-peer overlay discovery system. For example, the discovery processor 200 is suitable for use as the discovery processor 114 shown in FIG. 1. The discovery processor 200 comprises processor 202, memory 204, and transceiver 206 all coupled to a data bus 208. It should be noted that the discovery processor 200 is just one implementation and that other implementations are possible within the scope of the aspects.

The transceiver 206 comprises hardware and/or hardware executing software that operates to allow the discovery processor 200 to communicate data or other information with a plurality of nodes on a network. In an aspect, the transceiver 206 is operable to transmit a search query over a local area network using unicast, multicast, or broadcast transmissions. The transceiver 206 is also operable to transmit or listen to advertisements on a local area network or receive messages in response to transmitted search queries.

The memory 204 comprises any suitable storage device operable to store an overlay database 212 comprising information (i.e., meta-data) associated with one or more peer-to-peer overlay networks that the discovery processor 200 is aware of.

The memory 204 also comprises discovery module 214 which comprises one or more modules comprising instructions or codes executable by the processor 202 to provide the functions of the peer-to-peer overlay network discovery system described herein.

The processor 202 comprises at least one of a CPU, processor, gate array, hardware logic, memory elements, and/or hardware executing software. In an aspect, the processor 202 operates to execute instructions of the discovery module 214 to control the discovery processor 200 to perform the functions of the peer-to-peer overlay network discovery system described herein.

Maintain Overlay Network Database

During operation, the processor 202 operates to maintain the overlay database 212 with information about overlay networks the discovery processor 200 becomes aware of. For example, during normal message routing and network communications, the processor 202 becomes aware of information and/or meta-data associated with one or more overlay networks. The processor 202 operates to store this information and/or meta-data in the overlay database 212. For example, the information and meta-data associated with overlay networks comprises, but is not limited to the following information.

1. Overlay network names
2. Node addresses
3. Introducer node addresses
4. Content types
5. Specific content
6. Quality of service (QoS) parameters
7. Overlay network operating region
8. Overlay network type Transmit and Receive Overlay Network Advertisements In an aspect, the processor 202 operates to control the transceiver 206 to automatically transmit advertisements on a local area network. The advertisements comprise information from the overlay database 212 about known overlay networks. In another aspect, the transceiver 206 operates to listen to advertisements transmitted by other nodes in a local area network. The advertisements comprise information about overlay networks known to the other nodes originating the advertisements. The received advertisement information is passed to the processor 202 which uses the information to update the overlay database 212.

Search for Overlay Networks

In another aspect, the processor 202 operates to receive a request for information about overlay networks that match selected criteria. The request may originate from applications executing at the node at which the discovery processor 200 is located. For example, the request is received from one more applications over the link 216. The processor 202 processes the request to generate a search query that comprises the criteria, parameters or meta-data associated with the overlay networks for which a search will be conducted. The processor 202 controls the transceiver 206 to transmit the search query to other nodes in a local area network. For example, the transceiver 206 transmits the search query using at least one of a unicast, multicast, and broadcast transmission.

Nodes receiving the search query comprise their own respective DPs that operate to maintain overlay databases similar to the overlay database 212. The DPs at the receiving nodes search their respective overlay databases to determine information and/or meta-data about any overlay networks that match the parameters included in the search query. This information is returned to the DP 200. For example, the information is received on the link 210 by the transceiver 206, which passes the information to the processor 202. The processor 202 then informs the requesting entity (using the link 216) of the overlay networks that match the search query. Additionally, the processor 202 operates to update the overlay database 212 with any received information about newly discovered overlay networks.

In an aspect, the peer-to-peer overlay network discovery system comprises a computer program product having one or more program instructions ("instructions") or sets of "codes" stored or embodied on a machine-readable medium. When the codes are executed by at least one processor, for instance, the processor 202, their execution causes the discovery processor 200 to provide the functions of the peer-to-peer overlay network discovery system described herein. For example, the machine-readable medium comprises a floppy disk, CDROM, memory card, FLASH memory device, RAM, ROM, or any other type of memory device or machine-readable medium that interfaces to the discovery processor 200. In another aspect, the sets of codes may be downloaded into the discovery processor 200 from an external device or communication network resource. The sets of codes, when executed, operate to provide the functions of a peer-to-peer overlay network discovery system as described herein.

Figure 3:
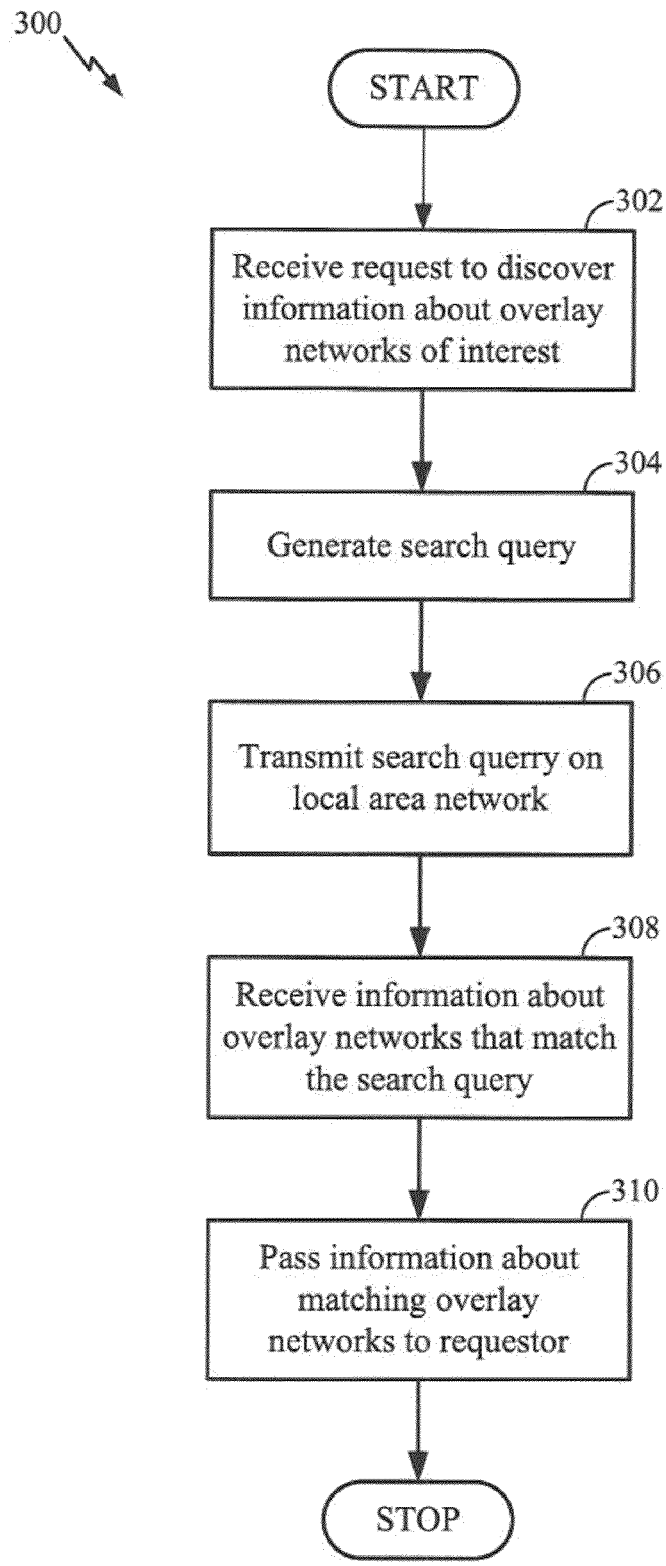
FIG. 3 shows an exemplary method for operating a discovery processor at a node to provide aspects of a peer-to-peer overlay network discovery system.

FIG. 3 shows an exemplary method 300 for operating a discovery processor at a node to provide aspects of a peer-to-peer overlay network discovery system. For clarity, the method 300 is described below with reference to the discovery processor 200 shown in FIG. 2. In an aspect, the processor 202 executes one or more sets of codes provided by the discovery module 214 to control the discovery processor 200 to perform the functions described below.

At block 302, a request is received to discover information about overlay networks of interest to the requester. In an aspect, the request is received over the link 216 by the processor 202 from applications executing at the node at which the DP 200 is located.

At block 304, a search query is generated based on the request. For example, the processor 202 generates the search query to comprise one or more parameters that describe or identify criteria associated with the overlay networks for which the search will be conducted. For example, the search query comprises but is not limited to the parameters described above.

At block 306, the search query is transmitted on a local area network. For example, the processor 202 controls the transceiver 206 to transmit the search query on the local area network using the communication link 210. The transceiver 206 transmits the search query using a unicast, multicast, or broadcast on the local area network.

At block 308, information about overlay networks that match the search query is received. For example, the transceiver 206 receives the information from nodes on the local area network. In one implementation, each node comprises a DP that maintains an overlay database of overlay network information. The DPs at those nodes identify selected overlay networks based on the one or more parameters in the search query. The nodes then transmit information about the selected overlay networks on the communication link 210 for reception by the transceiver 206. The transceiver 206 then passes the information to the processor 202.

At block 310, information received identifying overlay networks matching the search query is passed to the initial requestor. For example, the processor 202 passes the received information about the overlay networks that match the search query to the requesting application using the link 216.

Therefore, the method 300 is performed by a discovery processor at a node to provide aspects of a peer-to-peer overlay network discovery system. It should be noted that the method 300 is just one implementation and that the operations of the method 300 may be rearranged or otherwise modified within the scope of the various aspects. Thus, other implementations are possible with the scope of the various aspects described herein.

Figure 4:
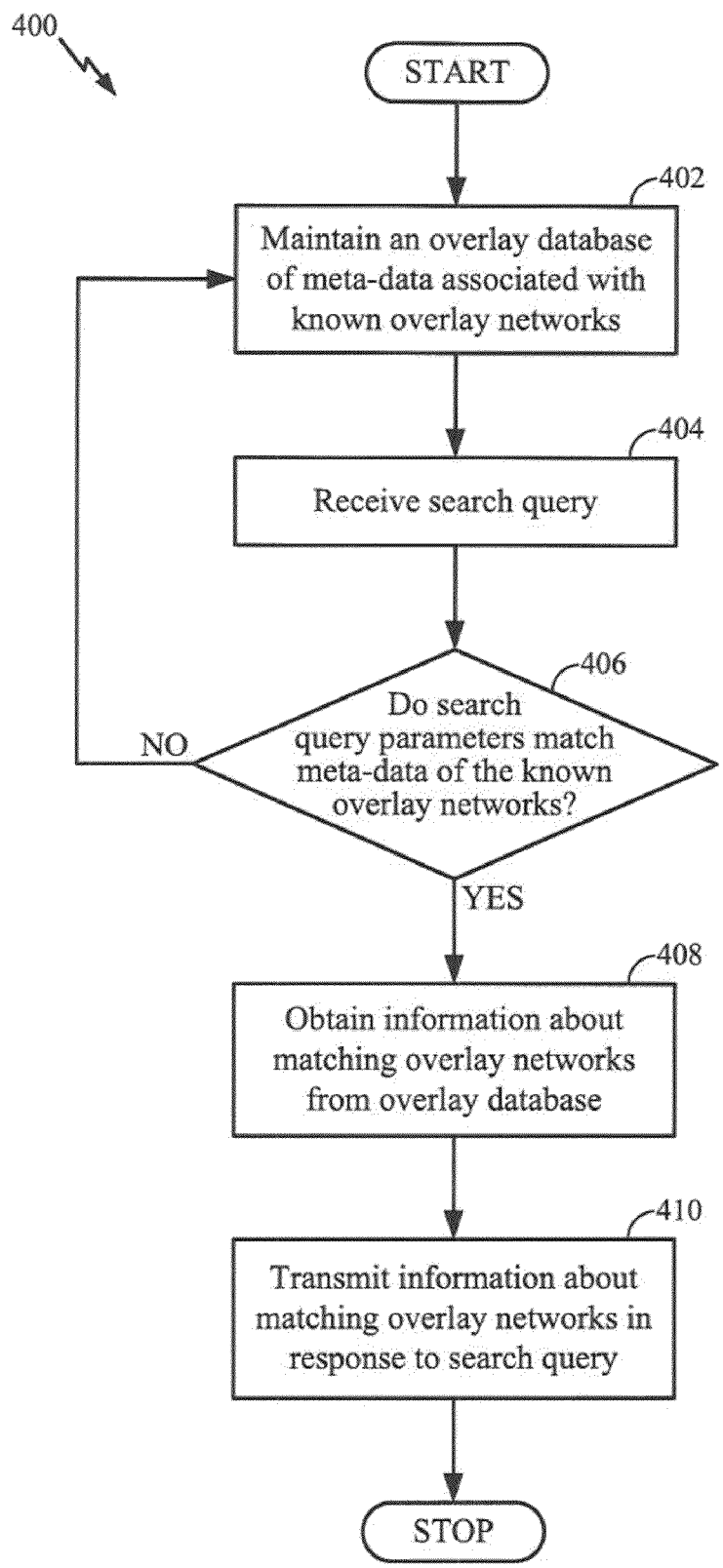
FIG. 4 shows an exemplary method for operating a discovery processor at a node to provide aspects of a peer-to-peer overlay network discovery system.

FIG. 4 shows an exemplary method 400 for operating a discovery processor at a node to provide aspects of a peer-to-peer overlay network discovery system. For clarity, the method 400 is described below with reference to the discovery processor 200 shown in FIG. 2. In an aspect, the processor 202 executes one or more sets of codes provided by the discovery module 214 to control the discovery processor 200 to perform the functions described below.

At block 402, an overlay database is maintained of meta-data associated with known overlay networks. For example, the processor 202 acquires information about one or more overlay networks during normal routing and message transactions on an underlying network. The processor 202 stores the meta-data associated with known overlay networks in the overlay database 212. In an aspect, the processor 202 updates the overlay database with meta-data associated with newly discovered overlay networks. For example, one or more overlay networks may be discovered during operation of the discovery processor on a local area network.

At block 404, a search query is received. For example, the transceiver 206 receives the search query in a unicast, multicast, or broadcast transmission on a local area network. The transceiver 206 receives the query on the communication link 210. The search query comprises one or more parameters identifying overlay networks of interest for which information is being sought.

In another aspect, the search query is generated locally in response to a request from an application executing at the node at which the DP 200 is located. For example, the processor 202 receives a request for information about overlay networks of interest to a requesting application. In an aspect, the request is received over the link 216 by the processor 202 from an application executing at the node at which the DP 200 is located.

At block 406, a determination is made as to whether parameters in the search query match any of the overlay networks which are described in the overlay database. For example, the processor 202 operates to match parameters in the search query with information stored in the overlay database 212 to determined meta-data and other information about known overlay networks that match the search query.

At block 408, assuming there is a match, the meta-data and other information that matches the parameters in the search query is obtained from the overlay database. For example, the processor 202 obtains the meta-data and other information that matches the search query from the overlay database 212.

At block 410, the meta-data and other information determined from the database based on the search query is transmitted in response to the search query. For example, the processor 202 controls the transceiver 206 to transmit the meta-data and other information to the entity associated with the search query. In one aspect, the meta-data is transmitted a node associated with the search query and is performed using the link 210. In another aspect wherein the search is performed on a local overlay database, the meta-data is transmitted to a local executing application associated with the initial request and is performed by the processor 202 using the link 216.

Therefore, the method 400 is performed by a discovery processor at a node to provide aspects of a peer-to-peer overlay network discovery system. It should be noted that the method 400 is just one implementation and that the operations of the method 400 may be rearranged or otherwise modified within the scope of the various aspects. Thus, other implementations are possible with the scope of the various aspects described herein.

Figure 5:
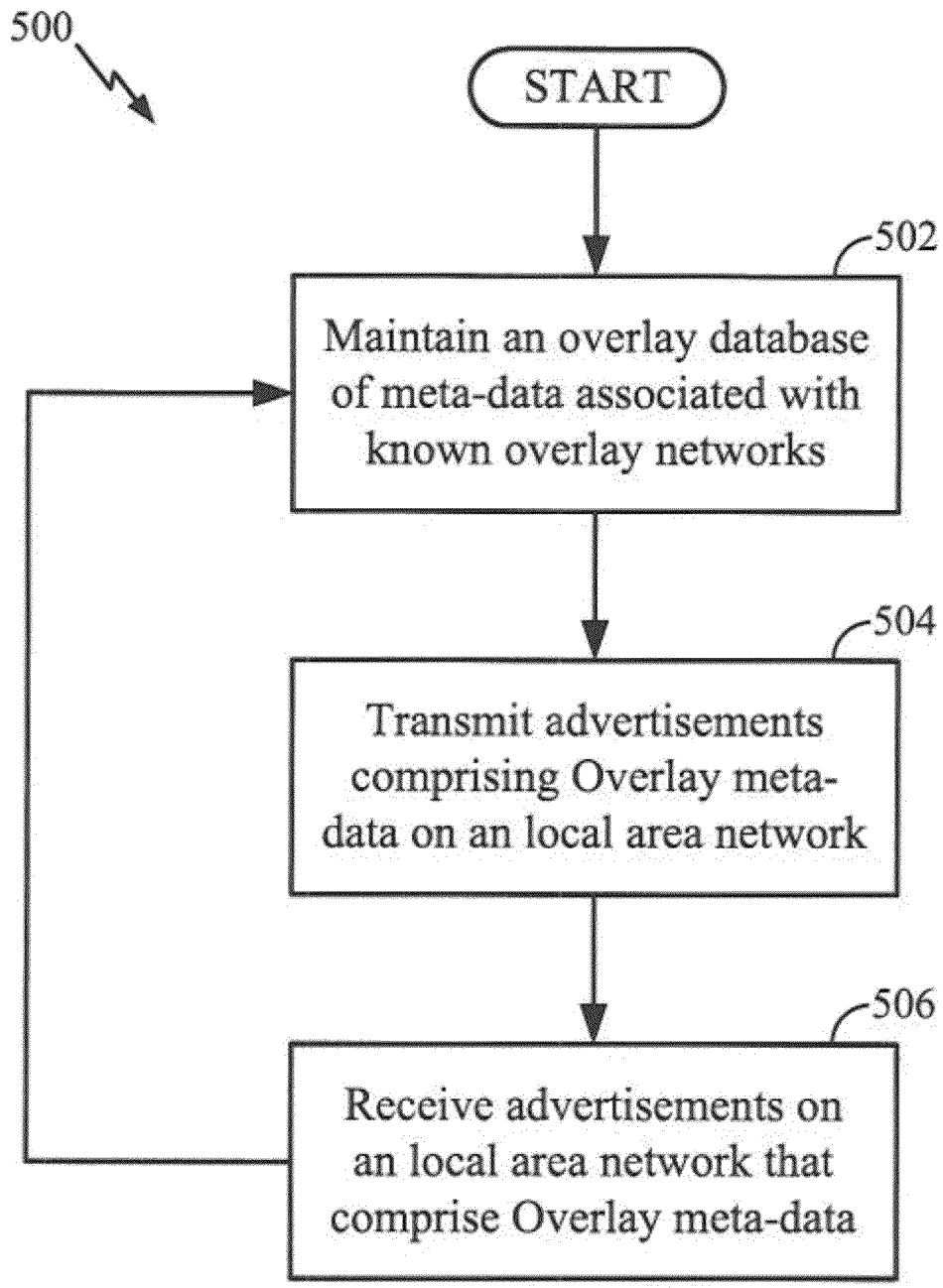
FIG. 5 shows an exemplary method for operating a discovery processor at a node to provide aspects of a peer-to-peer overlay network discovery system.

FIG. 5 shows an exemplary method 500 for operating a discovery processor at a node to provide aspects of a peer-to-peer overlay network discovery system. For clarity, the method 500 is described below with reference to the discovery processor 200 shown in FIG. 2. In an aspect, the processor 202 executes one or more sets of codes provided by the discovery module 215 to control the discovery processor 200 to perform the functions described below.

At block 502, an overlay database is maintained with meta-data associated with known overlay networks. For example, the processor 202 acquires information about one or more overlay networks during normal routing and message transactions on an underlying network. The processor 202 stores the meta-data associated with known overlay networks in the overlay database 212. In an aspect, the processor 202 updates the overlay database with meta-data associated with newly discovered overlay networks. For example, one or more overlay networks may be discovered during operation of the discovery processor on a local area network.

At block 504, advertisements are transmitted in a local area network. For example, the processor 202 obtains information from the overlay database 212 comprising meta-data associated with known overlay networks and passes this information to the transceiver 206. The transceiver 206 operates to transmit the meta-data on a local area network in one or more advertisements that can be received by any node in the local area that may be listening. For example, the transceiver 206 operates to transmit the one or more advertisements in at least one of a unicast, multicast, and broadcast transmission on the local area network.

At block 506, one or more advertisement are received that comprise meta-data about known overlay networks. For example, the transceiver 206 operates to listen to the advertisements from other node in a local area network and passes the received meta-data to the processor 202. For example, the transceiver 206 operates to receive the one or more advertisements in at least one of a unicast, multicast, and broadcast transmission on the local area network. The processor 202 then updates the overlay database 212 using the received meta-data. For example, the method proceeds to block 502 where the overlay database 212 is updated.

Therefore, the method 500 is performed by a discovery processor at a node to provide aspects of a peer-to-peer overlay network discovery system. It should be noted that the method 500 is just one implementation and that the operations of the method 500 may be rearranged or otherwise modified within the scope of the various aspects. Thus, other implementations are possible with the scope of the various aspects described herein.

It should also be noted that the methods 300, 400 and 500 can all be performed by the same discovery processor located at a node in a local area network. The operations of the methods 300, 400 and 500 may be combined, intermixed, or otherwise performed in parallel or serial fashion so that all the functions of the discovery system described herein can be performed by a single discovery processor.

Figure 6:
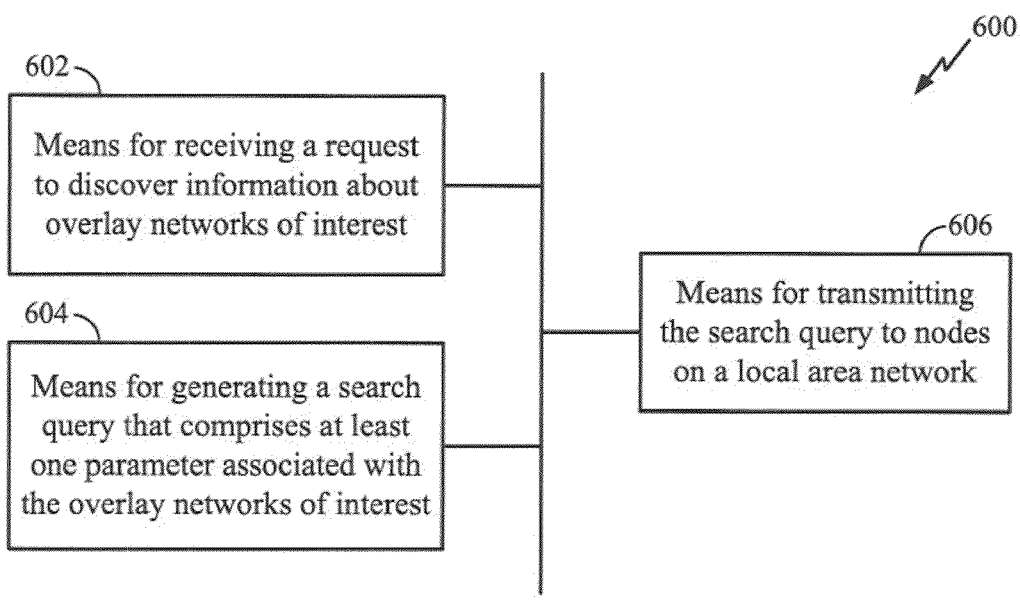
FIG. 6 shows an exemplary discovery processor for use at a node to provide aspects of a peer-to-peer overlay network discovery system.

FIG. 6 shows an exemplary discovery processor 600 for use at a node to provide aspects of an overlay network discovery system. For example, the discovery processor 600 is implemented in accordance with the discovery processor 200 shown in FIG. 2. In an aspect, the discovery processor 600 is implemented by at least one integrated circuit comprising one or more modules configured to provide aspects of an overlay network discovery system as described herein. For example, in an aspect, each module comprises hardware and/or hardware executing software.

The discovery processor 600 comprises a first module comprising means (602) for receiving a request to discover information about overlay networks of interest, which in an aspect comprises the processor 202. The discovery processor 600 also comprises a second module comprising means (604) for generating a search query that comprises at least one parameter associated with the overlay networks of interest, which in an aspect comprises the processor 202. The discovery processor 600 also comprises a third module comprising means (606) for transmitting the search query to nodes on a local area network, which in an aspect comprises the transceiver 206.

Figure 7:
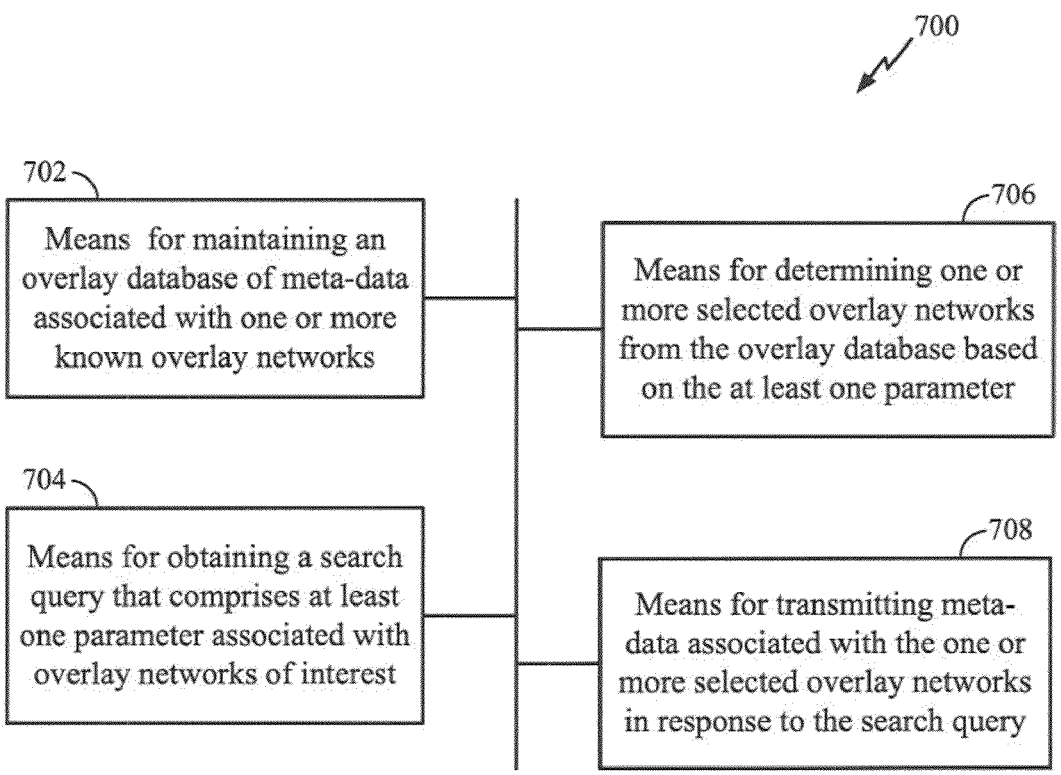
FIG. 7 shows an exemplary discovery processor for use at a node to provide aspects of a peer-to-peer overlay network discovery system.

FIG. 7 shows an exemplary discovery processor 700 for use at a node to provide aspects of an overlay network discovery system. For example, the discovery processor 700 is implemented in accordance with the discovery processor 200 shown in FIG. 2. In an aspect, the discovery processor 700 is implemented by at least one integrated circuit comprising one or more modules configured to provide aspects of an overlay network discovery system as described herein. For example, in an aspect, each module comprises hardware and/or hardware executing software.

The discovery processor 700 comprises a first module comprising means (702) for maintaining an overlay database of meta-data associated with one or more known overlay networks, which in an aspect comprises the memory 204. The discovery processor 700 also comprises a second module comprising means (704) for obtaining a search query that comprises at least one parameter associated with overlay networks of interest, which in an aspect comprises the processor 202. The discovery processor 700 also comprises a third module comprising means (706) for determining one or more selected overlay networks from the overlay database based on the at least one parameter, which in an aspect comprises the processor 202. The discovery processor 700 also comprises a fourth module comprising means (708) for transmitting meta-data associated with the one or more selected overlay networks in response to the search query, which in an aspect comprises the processor 202.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a wireless communication device. In the alternative, the processor and the storage medium may reside as discrete components in a wireless communication device.

The description of the disclosed aspects is provided to enable any person skilled in the art to make or use the present invention. Various modifications to these aspects may be readily apparent to those skilled in the art, and the generic principles defined herein may be applied to other aspects, e.g., in an instant messaging service or any general wireless data communication applications, without departing from the spirit or scope of the invention. Thus, the present invention is not intended to be limited to the aspects shown herein but is to be accorded the widest scope consistent with the principles and novel features disclosed herein. The word "exemplary" is used exclusively herein to mean "serving as an example, instance, or illustration." Any aspect described herein as "exemplary" is not necessarily to be construed as preferred or advantageous over other aspects.

Accordingly, while aspects of a peer-to-peer overlay network discovery system have been illustrated and described herein, it will be appreciated that various changes can be made to the aspects without departing from their spirit or essential characteristics. Therefore, the disclosures and descriptions herein are intended to be illustrative, but not limiting, of the scope of the invention, which is set forth in the following claims.

What is claimed is:

1. A method for operating a node to discover overlay networks, the method comprising:
   receiving a request to discover information about overlay networks of interest;
   generating a search query that comprises at least one parameter associated with the overlay networks of interest;
   transmitting the search query to nodes on a local area network; and
   receiving information associated with overlay networks that match the transmitted search query.

2. The method of claim 1, wherein said transmitting comprises performing at least one of unicasting, multicasting, and broadcasting the search query to the nodes on the local area network.

3. The method of claim 1, wherein said receiving the request to discover information comprises receiving the request from an application executing at the node.

4. The method of claim 1, wherein the at least one parameter comprises at least one of an overlay network name, content type parameter, specific content parameter, quality of service parameter, operating region parameter and overlay network type parameter.

5. The method of claim 1, wherein the receiving information associated with overlay networks that match the search query further comprises receiving the information from one or more nodes on the local area network.

6. The method of claim 5, further comprising passing the information associated with overlay networks that match the search query to an entity associated with the request.

7. An apparatus configured to discover overlay networks, the apparatus comprising:
   means for receiving a request to discover information about overlay networks of interest;
   means for generating a search query that comprises at least one parameter associated with the overlay networks of interest;
   means for transmitting the search query to nodes on a local area network, and
   means for receiving information associated with overlay networks that match the transmitted search query.

8. The apparatus of claim 7, wherein said means for transmitting comprises means for performing at least one of unicasting, multicasting, and broadcasting the search query to the nodes on the local area network.

9. The apparatus of claim 7, wherein said means for receiving the request to discover information comprises means for receiving the request from an application executing at the apparatus.

10. The apparatus of claim 7, wherein the at least one parameter comprises at least one of an overlay network name, content type parameter, specific content parameter, quality of service parameter, operating region parameter and overlay network type parameter.

11. The apparatus of claim 7, wherein the receiving information associated with overlay networks that match the search query comprises receiving the information from one or more nodes on the local area network.

12. The apparatus of claim 11, further comprising means for passing the information associated with overlay networks that match the search query to an entity associated with the request.

13. An apparatus configured to discover overlay networks, the apparatus comprising:
   a processor configured to receive a request to discover information about overlay networks of interest, generate a search query that comprises at least one parameter associated with the overlay networks of interest, and receive information associated with overlay networks that match the search query; and
   a transceiver configured to transmit the search query to nodes on a local area network.

14. The apparatus of claim 13, wherein said transceiver is configured to perform at least one of unicasting, multicasting, and broadcasting the search query to the nodes on the local area network.

15. The apparatus of claim 13, wherein said processor is configured to receive the request from an application executing at the apparatus.

16. The apparatus of claim 13, wherein the at least one parameter comprises at least one of an overlay network name, content type parameter, specific content parameter, quality of service parameter, operating region parameter and overlay network type parameter.

17. The apparatus of claim 13, wherein to receive information associated with overlay networks that match the search query further comprises to receive the information from one or more nodes on the local area network.

18. The apparatus of claim 17, wherein said processor is configured to pass the information associated with overlay networks that match the search query to an entity associated with the request.

19. A computer program product for discovering overlay networks, the computer program product comprising:
   a non-transitory computer-readable medium embodying codes executable to:
   receive a request to discover information about overlay networks of interest;
   generate a search query that comprises at least one parameter associated with the overlay networks of interest;
   transmit the search query to nodes on a local area network, and
   receive information associated with overlay networks that match the transmitted search query.

20. The computer program product of claim 19, wherein said codes are configured to perform at least one of unicasting, multicasting, and broadcasting the search query to the nodes on the local area network.

21. The computer program product of claim 19, wherein said codes are configured to receive the request from an application.

22. The computer program product of claim 19, wherein the at least one parameter comprises at least one of an overlay network name, content type parameter, specific content parameter, quality of service parameter, operating region parameter and overlay network type parameter.

23. The computer program product of claim 19, wherein said codes configured to receive information associated with overlay networks that match the search query are further configured to receive the information from one or more nodes on the local area network.

24. The computer program product of claim 23, wherein said codes are configured to pass the information associated with overlay networks that match the search query to an entity associated with the request.

25. A method for operating a node to discover overlay networks, the method comprising:
   maintaining an overlay database of meta-data associated with one or more known overlay networks;
   obtaining a search query that comprises at least one parameter associated with overlay networks of interest;
   determining one or more selected overlay networks from the overlay database based on the at least one parameter; and
   transmitting meta-data associated with the one or more selected overlay networks in response to the search query.

26. The method of claim 25, wherein said obtaining comprises receiving the search query in at least one of a unicast, multicast, and broadcast transmission on a local area network.

27. The method of claim 26, wherein said transmitting comprises transmitting meta-data associated with the one or more selected overlay networks to a node on the local area network that generated the search query.

28. The method of claim 25, wherein said obtaining comprises generating the search query at the node.

29. The method of claim 28, wherein said transmitting comprises transmitting meta-data associated with the one or more selected overlay networks to a local entity that initiated the search query.

30. The method of claim 25, wherein said determining comprises determining the one or more selected overlay networks by matching the at least one parameter with the meta-data maintained in the overlay database.

31. The method of claim 25, wherein the at least one parameter comprises at least one of an overlay network name, content type parameter, specific content parameter, quality of service parameter, operating region parameter and overlay network type parameter.

32. The method of claim 25, wherein said maintaining comprises updating the overlay database with meta-data associated with newly discovered overlay networks.

33. An apparatus configured to discover overlay networks, the apparatus comprising:
  means for maintaining an overlay database of meta-data associated with one or more known overlay networks;
  means for obtaining a search query that comprises at least one parameter associated with overlay networks of interest;
  means for determining one or more selected overlay networks from the overlay database based on the at least one parameter; and
  means for transmitting meta-data associated with the one or more selected overlay networks in response to the search query.

34. The apparatus of claim 33, wherein said means for obtaining comprises means for receiving the search query in at least one of a unicast, multicast, and broadcast transmission on a local area network.

35. The apparatus of claim 34, wherein said means for transmitting comprises means for transmitting meta-data associated with the one or more selected overlay networks to a node on the local area network that generated the search query.

36. The apparatus of claim 33, wherein said means for obtaining comprises means for generating the search query at the apparatus.

37. The apparatus of claim 36, wherein said means for transmitting comprises means for transmitting meta-data associated with the one or more selected overlay networks to a local entity that initiated the search query.

38. The apparatus of claim 33, wherein said means for determining comprises means for determining the one or more selected overlay networks by matching the at least one parameter with the meta-data maintained in the overlay database.

39. The apparatus of claim 33, wherein the at least one parameter comprises at least one of an overlay network name, content type parameter, specific content parameter, quality of service parameter, operating region parameter and overlay network type parameter.

40. The apparatus of claim 33, wherein said means for maintaining comprises means for updating the overlay database with meta-data associated with newly discovered overlay networks.

41. An apparatus configured to discover overlay networks, the apparatus comprising:
  a memory comprising an overlay database of meta-data associated with one or more known overlay networks; and
  a processor coupled to the memory and configured to:
    obtain a search query that comprises at least one parameter associated with overlay networks of interest;
    determine one or more selected overlay networks from the overlay database based on the at least one parameter; and
    transmit meta-data associated with the one or more selected overlay networks in response to the search query.

42. The apparatus of claim 41, wherein said processor is configured to receive the search query in at least one of a unicast, multicast, and broadcast transmission on a local area network.

43. The apparatus of claim 42, wherein said processor is configured to transmit meta-data associated with the one or more selected overlay networks to a node on the local area network that generated the search query.

44. The apparatus of claim 41, wherein said processor is configured to locally generate the search query at the apparatus.

45. The apparatus of claim 44, wherein said processor is configured to transmit meta-data associated with the one or more selected overlay networks to a local entity that initiated the search query.

46. The apparatus of claim 41, wherein said processor is configured to determine the one or more selected overlay networks by matching the at least one parameter with the meta-data maintained in the overlay database.

47. The apparatus of claim 41, wherein the at least one parameter comprises at least one of an overlay network name, content type parameter, specific content parameter, quality of service parameter, operating region parameter and overlay network type parameter.

48. The apparatus of claim 41, wherein said processor is configured to update the overlay database with meta-data associated with newly discovered overlay networks.

49. A computer program product configured to discover overlay networks, the computer program product comprising:
  a non-transitory computer-readable medium embodying codes executable to:
    maintain an overlay database of meta-data associated with one or more known overlay networks;
    obtain a search query that comprises at least one parameter associated with overlay networks of interest;
    determine one or more selected overlay networks from the overlay database based on the at least one parameter; and
    transmit meta-data associated with the one or more selected overlay networks in response to the search query.

50. The computer program product of claim 49, wherein said codes are configured to receive the search query in at least one of a unicast, multicast, and broadcast transmission on a local area network.

51. The computer program product of claim 50, wherein said codes are configured to transmit meta-data associated with the one or more selected overlay networks to a node on the local area network that generated the search query.

52. The computer program product of claim 49, wherein said codes are configured to locally generate the search query at the node.

53. The computer program product of claim 52, wherein said codes are configured to transmit meta-data associated with the one or more selected overlay networks to a local entity that initiated the search query.

54. The computer program product of claim 49, wherein said codes are configured to determine the one or more selected overlay networks by matching the at least one parameter with the meta-data maintained in the overlay database.

55. The computer program product of claim 49, wherein the at least one parameter comprises at least one of an overlay network name, content type parameter, specific content parameter, quality of service parameter, operating region parameter and overlay network type parameter.

56. The computer program product of claim 49, wherein said codes are configured to update the overlay database with meta-data associated with newly discovered overlay networks.

* * * * *